Patented June 26, 1951

2,558,053

UNITED STATES PATENT OFFICE 2,558,053

TEXTILE DECORATING

Samuel Lee, Yonkers, N. Y., assignor to Interchemical Corporation, New York, N. Y., a corporation of Ohio No Drawing. Application October 30, 1947,
Serial No. 783,228

12 Claims. (Cl. 260—22)

1

This invention relates to the pigment-decorating of textiles and is particularly concerned with the use in the dyeing and the printing of fabrics and textile materials of a composition comprising a pigmented dispersion of a high molecular-weight polymer of ethylene in a volatile organic liquid.

Pigmented compositions, either in the form of a pigmented lacquer containing a pigment-binder, usually an organic solvent-soluble thermosetting resin, or in the form of an emulsion of an aqueous medium in such a pigmented lacquer, have gone into extensive use in the printing and the dyeing of textiles and similar fabrics. The resulting pigment-decorated textile possesses the disadvantage, however, of crocking to more or less extent, i. e., of yielding a portion of its color to another material such as another fabric, for example, when the latter is rubbed thereover. Fabrics printed or dyed in deep shades exhibit the greatest tendency to crock, and the full utilization of pigments in the decoration thereof is accordingly limited.

Various procedures have been suggested heretofore for elimination or reduction of this tendency of such pigment-colored fabrics to crock, but all are objectionable for one reason or another. For example, the degree of crocking can be readily reduced by overpadding the pigment-printed or -dyed textile material with a solution of a suitable resin in an organic solvent and then heating the fabric to set and cure the resin. This process, however, is expensive and also requires a double treatment of the fabric, an operation that the trade resists. The degree of crocking can also be reduced by incorporating a larger amount of resin in the initial composition. This procedure is likewise expensive and, in addition, there is frequently also a loss of color value. Furthermore, both procedures generally result in the poduction of a finished fabric having an objectionable boardiness or stiffness.

I have now discovered that the crockfastness of such a pigment-printed or -dyed fabric can be materially improved, without imparting an objectionable hand to the finished fabric and with improvement in the color value, by utilizing as the printing paste or the dye bath a composition comprising a pigmented dispersion of a high molecular-weight, normally solid polymer of ethylene in a volatile organic liquid. Advantageously, in carrying out the present invention, I utilize a composition comprising a pigmented dispersion of a solid polyethylene in a solution of a thermosetting resin in a volatile organic solvent in order to render the finished fabric washfast as well. The resulting decorated fabric possesses an unusually high degree of crockfastness, and printings and dyeings in considerably deeper shades than have heretofore been deemed feasible can be obtained.

My pigmented polyethylene dispersion can be satisfactorily and successfully applied to a fabric either as such or in the form of a water-in-lacquer emulsion. In either case, a substantial improvement in crock-resistance is obtained; and the decorated fabric exhibits an increased color value and retains a relatively soft hand despite the deposition of additional solid material thereon.

In its simplest form accordingly my textile-decorating composition comprises essentially a pigmented dispersion of a normally solid polymer of ethylene in a volatile organic liquid. In its preferred form my composition comprises a pigmented dispersion of a normally solid polyethylene in a solution of a pigment-binder, advantageously a thermosetting resin, in a volatile organic solvent. In its emulsion form, the present composition comprises essentially water or a substantially aqueous medium emulsified as the inner phase in such a polyethylene dispersion.

The ethylene polymer may comprise any of those polymers that are solid or substantially solid under normal atmospheric conditions. Effective improvement in crockfastness is accomplished only with such normally solid ethylene polymers and is obtained regardless of the molecular weight of the particular polymer used. Polymers having an average molecular weight ranging from as low as 1,000, at which point the polymerized ethylene is still substantially solid, to as high as 50,000 and over may be satisfactorily utilized for this purpose. Representative of such polymers are those having a molecular weight of about 3,000 and a molecular weight ranging from about 18,000 to about 21,000, respectively.

No practicable improvement in crockfastness has been observed with polymers of a molecular weight lower than about 1,000; and even those that are relatively viscous liquids and which might be expected to be suitable for this purpose are ineffective. This difference appears to be due to the much better film-forming ability possessed by the solid polymers; and the resulting unusually strong, tough, and flexible film, I believe is largely responsible for the markedly increased crock-resistance obtained with the present composition. Apparently, when the wet fabric is heated to evaporate the organic liquid during the drying thereof, the polyethylene is softened and converted to a film that surrounds each pigment particle individually and, because of its toughness and flexibility enables the decorated fabric to effectively resist abrasion or rubbing.

Dispersion of the normally solid ethylene polymer, which is insoluble in all organic solvents at normal room temperature, can be accomplished in various ways as, for example, by ball-milling or grinding the polymer in the presence of an organic liquid, which may contain a dispersing agent. Care should be observed to continue the milling or grinding until the polymer is in an extremely finely divided condition in order to impart the necessary smoothness and homogeneity to the resulting textile-decorating composition.

Because such a dispersing procedure is rather expensive and time-consuming, however, I prefer to take advantage of the solubility characteristics of polyethylene in various organic solvents including aromatic hydrocarbons, turpentine, mineral oils, and the like at elevated temperatures. As is well known, such a polyethylene solution, upon being cooled, passes through a gel region, in which a semisolid, gel-like mass is formed, to an insoluble region, in which the dissolved polymer precipitates in the form of agglomerates or the like. The extent of the gel region depends not only on the particular solvent and the proportions of the polymer and the solvent, the gel region tending to disappear as the percentage of polymer approaches zero, but also on the particular polymer, the gel region being present only at increasingly higher temperatures as the molecular weight of the polymer increases.

Accordingly, in preparing the dispersion I first dissolve the solid ethylene polymer in such a solvent that has been heated to a temperature (e. g., 70 to 110° C.) sufficient to effect solution thereof. The resulting solution is then cooled to room temperature with sufficient agitation, however, to prevent crystallization of the dissolved polymer. Depending on the particular polymer utilized and also on the particular conditions of preparation, the polymer solidifies either as a gel or as a finely divided precipitate.

Both the gel-like mass and the precipitated form of the polyethylene are suitable for the present purpose. In the latter case, precaution should be taken, as by appropriate agitation of the polymer solution during cooling, to obtain the precipitate in a homogeneous condition. The product obtained in either event comprises a smooth dispersion of solid particles of polyethylene in the organic solvent, the particles in the gel-like mass, which resembles a salve in consistency, being of course extremely finely divided.

I prefer, however, to employ the polyethylene dispersion in the form of the gel-like mass because of the better color value provided thereby. Since a considerable degree of agitation is generally required to produce this gel form, it is desirable, especially with the higher molecular-weight polymers, to modify the solubility characteristics of the polyethylene so that a gel structure is directly obtained at room temperature. I find that this object can be readily attained by incorporating in the solvent another high molecular-weight polymeric material such as polyisobutylene, polystyrene, a copolymer of butadiene with styrene or acrylonitrile, and the like. These polymeric substances effect a stabilization of the polyethylene gel at room temperature and also act as plasticizers for the polyethylene and serve to improve the flow, viscosity, and other rheological properties of the dispersion.

Especially desirable results are obtained with polyisobutylenes; and such polymers suitable for this purpose comprise those having a molecular weight of at least 1,000, i. e., those polymers ranging from relatively viscous, heavy liquids through plastic solid substances. The higher molecular-weight polymers are generally preferable, for the viscosity of the resulting dispersion is directly proportional to the molecular weight of the polyisobutylene. Typical examples of suitable isobutylene polymers are those having molecular weights of about 6,000 and about 40,000 respectively although polymers of considerably higher molecular weight can also be used. No apparent increase in crockfastness is provided by the polyisobutylene, however, substantially the same degree of crock-resistance being produced whether or not such additional polymer is present.

While the present composition may comprise a simple dispersion of polyethylene in those cases where the washfastness of the decorated fabric is of no moment, an organic solvent-soluble binder is preferably also incorporated therein to impart wash- and scrub-resistance to the finished textile material. This binder may comprise any suitable plastic or solid film-forming, water-resistant material such as a cellulose derivative, e. g., ethyl cellulose, or a resin that is soluble in the organic liquid in which the polyethylene is dispersed and, if an emulsion is to be used, insoluble in water. Advantageously, however, a film-forming thermosetting resin is utilized as the binder. Various types of water-insoluble, organic solvent-soluble thermosetting resins such as urea-aldehyde resins including urea-formaldehyde resins, melamine-aldehyde resins including melamine-formaldehyde resins, phenol-aldehyde resins including phenol-formaldehyde resins, drying oil modified alkyd resins, and the like can be used. To be suitable, moreover, the thermosetting resin or other binder, after application of the composition to the fabric and heating of the fabric to dry it and, as the case may be, to convert the resin or other binder to a solvent-insoluble state, must be sufficiently resistant to washing and must be substantially insoluble in customary dry-cleaning solvents and must impart no objectionable stiffness to the finished fabric.

The organic liquid in which the ethylene polymer is dispersed must be readily volatile so that it can be evaporated by passage of the wet fabric over conventional drying equipment. If a thermosetting resin and/or a gel-stabilizing agent such as polyisobutylene is to be incorporated in the dispersion, the organic liquid selected should be a solvent therefor; and where the dispersion is to be used in its emulsified form, the organic liquid must be water-immiscible. Suitable solvents include turpentine, mineral spirits, pine oil, high-aromatic hydrocarbon solvents, e. g., a fraction having a boiling range of 310 to 350° F., and the like.

Any pigment can be incorporated into the present composition, but the pigment employed in any particular application should of course be selected in view of the nature of the finished goods and the expected use thereof; that is, it should be satisfactorily lightfast, if necessary it should not bleed to any substantial extent in dry-cleaning solvents such as naphtha and carbon tetrachloride, it should be resistant to soap to the degree required, or the like. Typical examples include the phthalocyanines, various metal oxides, carbon black, water-insoluble vat and azo dyestuffs, and the like.

In the preparation of the present composition, a polyethylene dispersion is first prepared by dissolving a normally solid ethylene polymer in an appropriate organic solvent heated to a temperature of 70 to 110° C., an isobutylene polymer or other gel-stabilizer, if one is to be used, having previously been incorporated therein, and cooling the resulting solution with sufficient agitation to prevent crystallization of the dissolved polyethylene. A pigmented lacquer is separately prepared by milling or flushing a pigment in an organic solvent, which may desirably be the same as that utilized for the polyethylene dispersion and in which a pigment-binder, usually an organic solvent-soluble thermosetting resin, has generally already been dissolved. A dispersing agent may be included in this lacquer. The polyethylene dispersion and the pigmented lacquer are then admixed as by simple mechanical agitation; and the resulting color concentrate which is unusually stable can be either used as such or cut with further solvent or other vehicle to the desired dyeing or printing consistency and shade.

Where the present composition is to be used in the form of an emulsion, a vehicle concentrate is simultaneously prepared by emulsifying water, which may contain an emulsion stabilizer such as common salt, into a suitable organic solvent, which may contain an emulsifying binder such as an alkyd-type resin dissolved therein. This concentrated water-in-lacquer emulsion is then cut with additional organic solvent and further water is emulsified thereinto to provide a vehicle or clear having the desired printing or dyeing consistency. The color concentrate is now cut with this vehicle in the proportions necessary to produce the specified shade.

Variations of these methods of preparation can, of course, be utilized. For example, the color concentrate can be cut with additional polyethylene dispersion instead of straight solvent where it is desired to increase the ratio of polyethylene to pigment. Again, the color concentrate can be prepared in the form of an emulsion, if desired, by adding further solvent and emulsifying water thereinto. Moreover, a vehicle concentrate can be prepared with polyethylene dispersed in the lacquer phase thereof and can be utilized in place of the customary clear concentrate.

The appearance of the present composition varies, of course, with the desired consistency and the manner of preparation thereof. For example, the preferred gel-like base dispersion possesses a relatively high yield value and is not readily flowable by itself; nevertheless, when suitably pigmented, it can be used for printing textiles, for it easily and smoothly wipes into and separates from an intaglio-type engraving. Cutting of the color concentrate with a straight solvent or lacquer vehicle results in a composition having a thinner, more fluid body; whereas cutting with an emulsion clear results in a composition having the consistency of such clear, which will have been bodied more or less in accordance with the expected use of the colored composition, a more paste-like consistency generally being preferred for printing operations.

The proportions of the several ingredients of the present composition may vary widely and depend largely on the requirements of the finished fabric and the nature of the particular application. Generally, in printing with the present composition in the form of an emulsion, the aqueous phase comprises a higher percentage of the total composition than in dyeing therewith since, as is well known, the emulsification of an increasing amount of water into such an emulsion tends to thicken it. The depth of color desired obviously governs the amount of pigment used. The polyethylene should be sufficient in amount to render the finished fabric satisfactorily crockfast; and the amount of pigment binder should similarly be sufficient to impart the necessary degree of washfastness to the finished fabric.

Advantageously, the polyethylene and the pigment are present in a ratio ranging from about 0.1:1 to 100:1 by weight. Although some increase in crock-resistance can be obtained with a lower ratio, satisfactory improvement in crockfastness first becomes appreciably noticeable when the polyethylene and the pigment are present in about the indicated minimum ratio. There is not much to be gained in utilizing the polyethylene and the pigment in a ratio greater than the indicated maximum since the shade of the resulting decorated fabric is then so light that crocking no longer presents a problem.

In this connection, it should be borne in mind that the percentage of pigment in the present composition and the nature of the dispersion itself place a practical limit on the percentage of polyethylene that can be incorporated therein in any given instance. Obviously, in a composition containing a relatively high amount of pigment, the practical maximum ratio of polyethylene to pigment is less than the corresponding maximum ratio when the composition contains a relatively low amount of pigment. Since the actual textile-decorating composition itself is usually prepared by cutting a color concentrate containing the polyethylene with a suitable vehicle or clear in proportions to produce the desired depth of shade, obviously the percentage of pigment in the resulting composition decreases the more the color concentrate is cut with the clear while the ratio of polyethylene to pigment remains the same. If the vehicle also contains an ethylene polymer dispersed therein, then the ratio of polyethylene to pigment obviously increases the more the color concentrate is cut.

Where an isobutylene polymer is also included in the dispersion, it is advantageously present in a ratio ranging from about 0.05:1 to 10:1 by weight with respect to the polyethylene. No significant effect is noticeable with a smaller amount of polyisobutylene. Above the indicated maximum, the tack of the polyisobutylene begins to manifest itself in an undesirable manner and, in fact, an increase in the degree of crocking becomes apparent.

Where the present composition is to be utilized in the printing of a fabric, it can be applied thereto in any convenient manner as from an intaglio cylinder. Where it is employed in the dyeing of a fabric, it can be applied by means of a pad-dyeing operation; or it can be deposited on the fabric in the form of a thin film by transfer from a roll-coating machine. The decorated fabric can be conveniently dried by passage over conventional drying equipment such as a bank of steam-heated drying cans maintained at a temperature in the range of 210 to 250° F.; and the dried fabric, if it is desired to do so, can be passed through a curing chamber maintained at a temperature of 300 to 350° F. to cure the thermosetting resin, where it comprises the pigment binder. Heating of some sort in drying the wet fabric is necessary, however, in order to effect a softening of the dispersed polyethylene and to thereby impart the desired crockfastness to the fabric.

The reduction in the degree of crocking accomplished with the instant composition can be effected whether a deep or a light shade is desired in the finished fabric; and my invention thus permits the wide application and full utilization of pigments in the decoration of textiles. Fabrics can be colored a deep shade with the present composition with substantial elimination of dry crock and material reduction of wet crock. Particularly important applications of my improved composition lie in blotch printing, i. e., the printing of designs containing large areas of solid color, and in pad-dyeing.

As is the case with the pigment-binder, the polyethylene and the gel stabilizer such as polyisobutylene, if it is used, are deposited on the fabric in discontinuous films that do not bridge over the individual yarns regardless of whether the straight dispersion or the emulsion is used. No appreciable boardiness, accordingly, is imparted to the decorated fabric, which retains substantially its initial hand. Moreover, despite the deposition of an additional discontinuous film on each fiber, the resulting fabric possesses generally a deeper, fuller color value. In comparison, a pigmented emulsion containing an increased amount of thermosetting resin in the lacquer phase imparts a marked boardiness to the resulting decorated fabric, the color value of which, especially in the deeper shades, is also adversely affected. In addition, some improvement in washfastness and a better light-wash-resistance are noticeable.

Various types of fabrics can be decorated by means of my improved composition and the application of my invention is not limited to the decoration of any particular fabric. Excellent resistance to crocking and excellent color value without boardiness of the finished fabric are obtained equally well whether the fabric being decorated is composed of natural fibers such as cotton, flax, wool, and hair fibers, of synthetic fibers such as regenerated cellulose, cellulose acetate, polyamide, protein polymer, vinyl polymer, and the like fibers, or inorganic fibers such as glass, mineral, or metal fibers, or of mixtures of such fibers. Furthermore, the application of my invention is not limited to the usual types of woven or knitted fabrics but may also be used to decorate pile fabrics, paper, or fabrics made by processes such as combing, matting, or felting, e. g., a fabric composed of loosely meshed cotton fibers bonded together by the localized application of a resin. The present invention, moreover, is equally applicable whether a light or a heavy fabric is being decorated. (The term "fabric" as used in the claims includes all of these various types of materials as well as yarns, to the decorating of which my invention is also applicable.)

The following examples are typical illustrations of color concentrates prepared in accordance with the present invention and suitable for use either directly or cut with an appropriate vehicle:

EXAMPLE 1

A pigmented lacquer is prepared by suitably mixing the following ingredients (parts by weight in this and other examples):

High-aromatic hydrocarbon solvent (boiling range of 310 to 350° F.) _____ 32
50% solution of hydrophobic melamine-formaldehyde resin in an equal admixture of butanol and xylene _____ 12
Iron complex of nitroso-beta-naphthol (e. g., Permanza Green) _____ 12

A polyisobutylene solution is separately prepared from:

Hydrocarbon solvent as above _____ 32
Polyisobutylene (molecular weight of 6,000) __ 6

This solution is heated, and there is dissolved therein:

Polyethylene (molecular weight ranging between 18,000 and 21,000) _____ 6 the resulting polyethylene solution being cooled with agitation to form a homogeneous semisolid gel-like mass.

The pigmented resin lacquer is then blended with the polyethylene dispersion to produce a low-crock color concentrate.

EXAMPLE 2

A pigmented lacquer is prepared by mixing:

High-aromatic hydrocarbon solvent (boiling range of 370 to 400° F.) _____ 25
50% solution of hydrophobic urea-formaldehyde resin in an equal admixture of butanol and xylene _____ 20
Calcium stearate _____ 5
Iron oxide brown _____ 20

A polyisobutylene solution is prepared from:

Hydrocarbon solvent as above _____ 20
Polyisobutylene (molecular weight of 140,000) 5

This solution is heated and

Polyethylene (molecular weight of 3,000) ____ 5 is dissolved therein, the resulting solution being cooled with agitation. A gel having a salve-like consistency is obtained.

The pigmented lacquer and the polyethylene dispersion are then blended into a color concentrate.

EXAMPLE 3

The following ingredients are mixed to form a pigmented lacquer:

Mineral spirits _____ 32
Hydrophobic melamine-formaldehyde resin solution of Example 1 _____ 15
Carbon black _____ 15

A polyethylene dispersion is separately prepared from the following:

Mineral spirits _____ 32
Polyethylene (molecular weight ranging from 18,000 to 21,000 _____ 6 the solvent being heated to 100° C. to dissolve the polyethylene and the resulting solution then being cooled with agitation.

The color concentrate formed by mixing the pigmented lacquer and the polyethylene dispersion can be used directly as a printing paste and yields prints of much deeper jetness with a crock-resistance superior to that ordinarily obtained with considerably lighter shades.

EXAMPLE 4

A pigmented lacquer is prepared by suitably mixing the following ingredients:

Xylene _____ 10

| Hydrophobic melamine-formaldehyde resin solution of Example 1 | 20 |
|---|---|
| Lecithin | 2 |
| Ultramarine blue | 40 |

A separate solution is prepared from the following:

| Xylene | 18 |
|---|---|
| Polyisobutylene (molecular weight of 40,000) | 3 | and is heated; there is then dissolved therein:

| Polyethylene (molecular weight ranging from 18,000 to 21,000) | 7 |
|---|---| the resulting polyethylene solution being cooled with agitation with formation of a gel-like mass.

This polyethylene dispersion is then admixed with the pigmented lacquer to form a color concentrate.

The following example is a typical illustration of an emulsion vehicle concentrate for use in cutting the color concentrates of Examples 1 to 4:

Example I

A vehicle concentrate is prepared by forming a lacquer from the following:

| Mineral spirits | 25 |
|---|---|
| 70% drying oil-modified phthalic-glyceride alkyd resin (e. g., Beckasol No. 18) | 25 | and emulsifying thereinto:

| Water | 45 |
|---|---|
| Sodium chloride | 5 |

The alkyd resin has a viscosity of V to X on the Gardner scale and an acid number of 10 to 15.

This vehicle concentrate can then be cut by the addition of further mineral spirits and water in the proportions necessary to give either a printing or a dyeing vehicle having the body and the viscosity desired:

Example II

A printing vehicle is prepared by adding mineral spirits to the vehicle concentrate and emulsifying water thereinto in the following proportions:

| Vehicle concentrate of Example I | 6 |
|---|---|
| Mineral spirits | 20 |
| Water | 74 |

Example III

A typical pad-dyeing vehicle is prepared by addition of mineral spirits to the vehicle concentrate and emulsification of water thereinto in the following proportions:

| Vehicle concentrate of Example I | 6 |
|---|---|
| Mineral spirits | 40 |
| Water | 54 |

Printing pastes and pad-dyeing liquors can be prepared by cutting the color concentrate of Examples 1 to 4 with the printing vehicle and the pad-dyeing vehicle of Examples II and III, respectively. The proportions in which the color concentrate and the respective vehicle are mixed depend, of course, on the depth of shade desired in the finished fabric. Typical examples of a printing paste and of a pad-dyeing liquor are illustrated by the following:

EXAMPLE A

A printing paste giving a deep shade is prepared by cutting a color concentrate with the printing vehicle in the following proportions:

| Color concentrate of Example 1 | 1 |
|---|---|
| Printing vehicle of Example II | 2 |

A textile such as cotton percale printed with this paste exhibits substantially no crocking, possesses a soft hand, and has a full, even color value.

EXAMPLE B

A pad-dyeing liquor giving a medium shade is prepared by cutting a color concentrate with the pad-dyeing vehicle in the following proportions:

| Color concentrate of Example 4 | 1 |
|---|---|
| Pad-dyeing vehicle of Example III | 10 |

When a textile such as rayon is dyed with this liquor, it is extremely crockfast, exhibits no particular increase in stiffness, and has a good color.

The color concentrate can also be cut with a straight solvent vehicle, and the following example illustrates such a procedure for preparing a printing paste:

EXAMPLE C

| Color concentrate of Example 3 | 1 |
|---|---|
| Mineral spirits | 2 |

Similarly, the color concentrates can be cut with a vehicle comprising the polyethylene dispersion itself, as follows:

EXAMPLE D

| Color concentrate of Example 2 | 1 |
|---|---|
| Polyethylene dispersion (unpigmented) of Example 2 | 2 |
| Mineral spirits | 3 |

The proportion of polyethylene in the final composition can also be increased by cutting the color concentrates with an emulsion vehicle having a polyethylene dispersed in the lacquer phase, an example of which is illustrated by the following:

Example IV

| Vehicle concentrate of Example II | 6 |
|---|---|
| Polyethylene dispersion (unpigmented) of Example 2 | 5 |
| Mineral spirits | 15 |
| Water | 74 |

The vehicle concentrate and the polyethylene dispersion are blended, the mineral spirits is added thereto, and the water is emulsified thereinto.

The resulting vehicle can be used to cut a color concentrate in the manner indicated above.

I claim:

1. A low-crock textile-decorating composition comprising a water-in-lacquer emulsion, the lacquer phase of which comprises a pigmented dispersion of a solid polyethylene in a solution of a thermosetting resin in a volatile water-immiscible organic solvent, the ratio of polyethylene to pigment ranging from about 0.1:1 to 100:1 by weight.

2. A low-crock textile-decorating composition comprising a water-in-lacquer emulsion, the lacquer phase of which comprises a pigmented dispersion of a solid polyethylene in a solution of a thermosetting resin and a polyisobutylene having a molecular weight of at least 1,000 in a volatile water-immiscible organic solvent, the ratio of polyethylene to pigment ranging from about 0.1:1 to 100:1 by weight and the ratio of polyisobutylene to polyethylene ranging from about 0.05:1 to 10:1 by weight.

3. The method of decorating a textile, which comprises applying thereto a water-in-lacquer emulsion, the lacquer phase of which comprises a pigmented dispersion of a solid polyethylene in a solution of a thermosetting resin and a polyisobutylene having a molecular weight of at least 1,000 in a volatile water-immiscible organic solvent, the ratio of polyethylene to pigment ranging from about 0.1:1 to 100:1 by weight and the ratio of polyisobutylene to polyethylene ranging from about 0.05:1 to 10:1 by weight, and thereafter heating the decorated textile to dry it and to set the thermosetting resin.

4. The method of decorating a textile, which comprises applying thereto a water-in-lacquer emulsion, the lacquer phase of which comprises a pigmented dispersion of a solid polyethylene in a solution of a thermosetting resin in a volatile organic solvent, the ratio of polyethylene to pigment ranging from about 0.1:1 to 100:1 by weight, and thereafter heating the decorated textile to dry it and to set the thermosetting resin.

5. An unpigmented clear emulsion for use in textile decorating emulsions comprising a water-in-lacquer emulsion, the lacquer phase of which comprises a colloidal dispersion of solid polyethylene resin in a solution of polyisobtuylene having a molecular weight of 6,000 to 140,000, in a volatile water-immiscible organic solvent, and wherein the ratio of polyethylene to polyisobutylene is within the limits of 0.05:1 to 10:1 by weight.

6. An unpigmented clear emulsion for use in textile decorating emulsions comprising a water-in-lacquer emulsion, the lacquer phase of which comprises a colloidal dispersion of solid polyethylene resin in a solution of polyisobutylene having a molecular weight of 6,000 to 40,000, in a water-immiscible organic solvent, and wherein the ratio of polyethylene and polyisobutylene is within the limits of 0.05:1 to 10:1 by weight.

7. A composition as defined in claim 5 which contains a drying oil modified alkyd resin.

8. A textile decorating composition comprising a pigmented water-in-lacquer emulsion, the lacquer phase of which comprises a colloidal dispersion of solid polyethylene resin in a solution of polyisobutylene having a molecular weight of 6,000 to 140,000, in a volatile water-immiscible organic solvent, and wherein the ratio of polyethylene to polyisobutylene is within the limits of 0.05:1 to 10:1 by weight.

9. A textile decorating composition comprising a pigmented water-in-lacquer emulsion, the lacquer phase of which comprises a colloidal dispersion of solid polyethylene resin in a solution of polyisobutylene having a molecular weight of 6,000 to 40,000, in a volatile water-immiscible organic solvent, and wherein the ratio of polyethylene to polyisobutylene is within the limits of 0.05:1 to 10:1 by weight.

10. A textile decorating composition as in claim 8 which contains a thermosetting resin.

11. A textile decorating composition as in claim 8 which contains a drying oil modified alkyd resin.

12. A textile decorating composition comprising a pigmented water-in-lacquer emulsion, the lacquer phase of which comprises a colloidal dispersion of solid polyethylene resin in a solution in a volatile water-immiscible organic solvent of 1) polyisobutylene of molecular weight 6,000 to 140,000, 2) a thermosetting resin, and 3) a drying oil modified alkyd resin, wherein the ratio of polyethylene to polyisobutylene is within the limits of 0.05:1 to 10:1 by weight.

SAMUEL LEE.

REFERENCES CITED

The following references are of record in the file of this patent:

UNITED STATES PATENTS

| Number | Name | Date |
|---|---|---|
| 2,313,144 | Gomm | Mar. 9, 1943 |
| 2,339,958 | Sparks | Jan. 25, 1944 |
| 2,384,848 | Peters | Sept. 18, 1945 |
| 2,414,300 | Hamilton | Jan. 14, 1947 |
| 2,434,662 | Lathan et al. | Jan. 20, 1948 |
| 2,436,080 | Smith | Feb. 17, 1948 |